(12) United States Patent
Inuzuka et al.

(10) Patent No.: US 7,392,959 B2
(45) Date of Patent: *Jul. 1, 2008

(54) SEAT BELT RETRACTOR AND SEAT BELT DEVICE

(75) Inventors: Koji Inuzuka, Shiga (JP); Koji Tanaka, Moriyama (JP)

(73) Assignee: Takata Corporation, Tokyo (JP)

( * ) Notice: Subject to any disclaimer, the term of this patent is extended or adjusted under 35 U.S.C. 154(b) by 373 days.

This patent is subject to a terminal disclaimer.

(21) Appl. No.: 10/848,004

(22) Filed: May 19, 2004

(65) Prior Publication Data

US 2005/0029382 A1  Feb. 10, 2005

(30) Foreign Application Priority Data

Aug. 7, 2003 (JP) .............................. 2003-288579

(51) Int. Cl.
*B65H 75/48* (2006.01)
(52) U.S. Cl. .................................................. 242/390.9
(58) Field of Classification Search .............. 242/390.8, 242/390.9; 280/807; 297/475; 192/56.61; 464/39

See application file for complete search history.

(56) References Cited

U.S. PATENT DOCUMENTS 4,062,203 A * 12/1977 Leonard et al. ............... 464/38
2005/0061904 A1* 3/2005 Inuzuka et al. ........... 242/379.1

FOREIGN PATENT DOCUMENTS

| DE | 101 41 240 A1 | 3/2003 |
| EP | 1 382 497 | 1/2004 |
| JP | 61-134465 | 8/1986 |
| WO | 99/59848 | 11/1999 |

* cited by examiner

*Primary Examiner*—William A Rivera
(74) *Attorney, Agent, or Firm*—Manabu Kanesaka (57) ABSTRACT

A seat belt retractor for winding a seat belt includes a spool for winding the seat belt, a motor connected to the spool for generating driving torque to rotate the spool, a driving torque transmission mechanism disposed between the motor and the spool and formed of a gear for transmitting the driving torque of the motor to the spool, and a torque limiter mechanism disposed in the driving torque transmission mechanism for preventing a load greater than a predetermined level from being transmitted to the driving torque transmission mechanism.

10 Claims, 6 Drawing Sheets

SEAT BELT RETRACTOR AND SEAT BELT DEVICE

BACKGROUND OF THE INVENTION AND RELATED ART STATEMENT

The present invention relates to a seat belt retractor installed in a vehicle such as an automobile for winding a seat belt on a spool with driving torque of a motor to restrain and protect an occupant, and more particularly, to a seat belt retractor in which a load torque above a predetermined value is not transmitted from a spool to a driving torque transmission mechanism that transmits the driving torque of the motor to the spool. The present invention also relates to a seat belt device provided with the seat belt retractor.

Conventionally, a seat belt device is installed in a vehicle such as an automobile, and a seat belt restrains an occupant so that the occupant does not move out of a vehicle seat, thereby protecting the occupant in case of emergency such as a vehicle collision in which large deceleration is exerted on the vehicle. The seat belt device is provided with a seat belt retractor for urging a spool with the seat belt wound thereon in a direction of winding the belt all the time. The seat belt retractor locks the spool not to rotate in a direction of unwinding the seat belt when an emergency locking mechanism (ELR mechanism) is activated in case of emergency as mentioned above, thereby preventing the seat belt from being withdrawn.

As a conventional seat belt retractor, Japanese Utility Model Publication (Kokai) No. 61-134465 has disclosed a seat belt retractor in which a motor drives a spool with driving torque to rotate to wind a seat belt. In such a seat belt retractor, it is possible to control a tension of the seat belt with the motor for winding the seat belt. Accordingly, it is possible to select various modes of winding the seat belt, thereby adjusting the seat belt to restrain an occupant according to a condition such as a vehicle running condition.

In the conventional seat belt retractor as disclosed in Japanese Utility Model Publication (Kokai) No. 61-134465, when the automobile collides lightly in an extent that an ELR mechanism is not activated while the motor is winding the seat belt, the seat belt is withdrawn due to inertia of the occupant so that tension may be applied to the seat belt.

Accordingly, a load due to energy of the tension on the seat belt is transmitted to the spool. When the load is transmitted to a driving torque transmission mechanism via the spool when the motor rotates the spool in a direction of winding the belt, a load torque larger than that in a normal state acts on a component such as a gear composing the driving torque transmission mechanism. Accordingly, it is necessary to increase strength of the component such as a gear in the driving torque transmission mechanism, so that the component withstands such large torque. Further, the motor needs to generate the driving torque against the load transmitted to the driving torque transmission mechanism, thereby increasing load on the motor.

In view of the problems described above, the present invention has been made, and an object of the present invention is to provide a seat belt retractor driven with a motor in which load torque larger than a predetermined level is not transmitted to a driving torque transmission mechanism when the motor drives. Another object of the present invention is to provide a seat belt device provided with the seat belt retractor.

Further objects and advantages of the invention will be apparent from the following description of the invention.

SUMMARY OF THE INVENTION

To achieve the objects described above, according to a first aspect of the present invention, a seat belt retractor includes a spool for winding a seat belt; a motor for generating driving torque to rotate the spool; and a driving torque transmission mechanism comprising a predetermined number of gears for transmitting the driving torque of the motor to the spool. The seat belt is wound on the spool through the driving torque of the motor. The seat belt retractor further includes a torque limiter mechanism for preventing load torque greater than a predetermined level from being transmitted to the driving torque transmission mechanism.

According to a second aspect of the present invention, in the seat belt retractor, the torque limiter mechanism includes a clutch for shutting off the driving torque transmission when the load torque above the predetermined level is transmitted to the driving torque transmission mechanism.

According to a third aspect of the present invention, in the seat belt retractor, the clutch includes first ratchet teeth disposed at a side of the motor for transmitting the driving torque of the motor, and second ratchet teeth disposed at a side of the spool in the driving torque transmission mechanism for engaging the first ratchet teeth to transmit the driving torque and for disengaging from the first ratchet teeth to shut off the driving torque transmission when the load torque above the predetermined level is transmitted.

According to a fourth aspect of the present invention, a seat belt device includes the seat belt retractor described above, a seat belt, a tongue for passing the seat belt, and a buckle for engaging the tongue.

In the first to third aspects of the invention, the torque limiter mechanism is provided so that the load torque above the predetermined level is not transmitted to the driving torque transmission mechanism. Such large load torque may be generated when a vehicle collides lightly while the motor is winding the seat belt and tension is generated on the seat belt due to deceleration. Accordingly, a component of the driving torque transmission mechanism such as a gear does not need to have an unnecessarily high strength. It is also possible to reduce load torque on the motor.

In the second and third aspects of the invention, the torque limiter mechanism is formed of the clutch, thereby making the torque limiter mechanism simple. In the third aspect of the invention, the clutch comprises a pair of the first and second ratchet teeth at the sides of the motor and the spool engaging with each other, thereby making further the torque limiter mechanism simple.

BRIEF DESCRIPTION OF THE DRAWINGS

FIGS. 2(a) and 2(b) are views showing a sun gear member of a driving torque transmission mechanism in the seat belt retractor shown in FIG. 1, wherein

FIGS. 3(a) to 3(c) are views showing a torque limiter mechanism of the seat belt retractor shown in FIG. 1, wherein

FIGS. 4(a) to 4(d) are views for explaining a process of transmitting the driving torque when the seat belt retractor winds a seat belt, wherein

FIGS. 5(a) to 5(d) are views for explaining a process of transmitting the driving torque in a direction of unwinding the seat belt when the pawl member releases the ring member, wherein FIG. 5(c) is a view for explaining the process of transmitting the driving torque to the ring member.

DETAILED DESCRIPTION OF PREFERRED EMBODIMENTS

Hereunder, embodiments of the present invention will be described with reference to the accompanying drawings.

Figure 1:
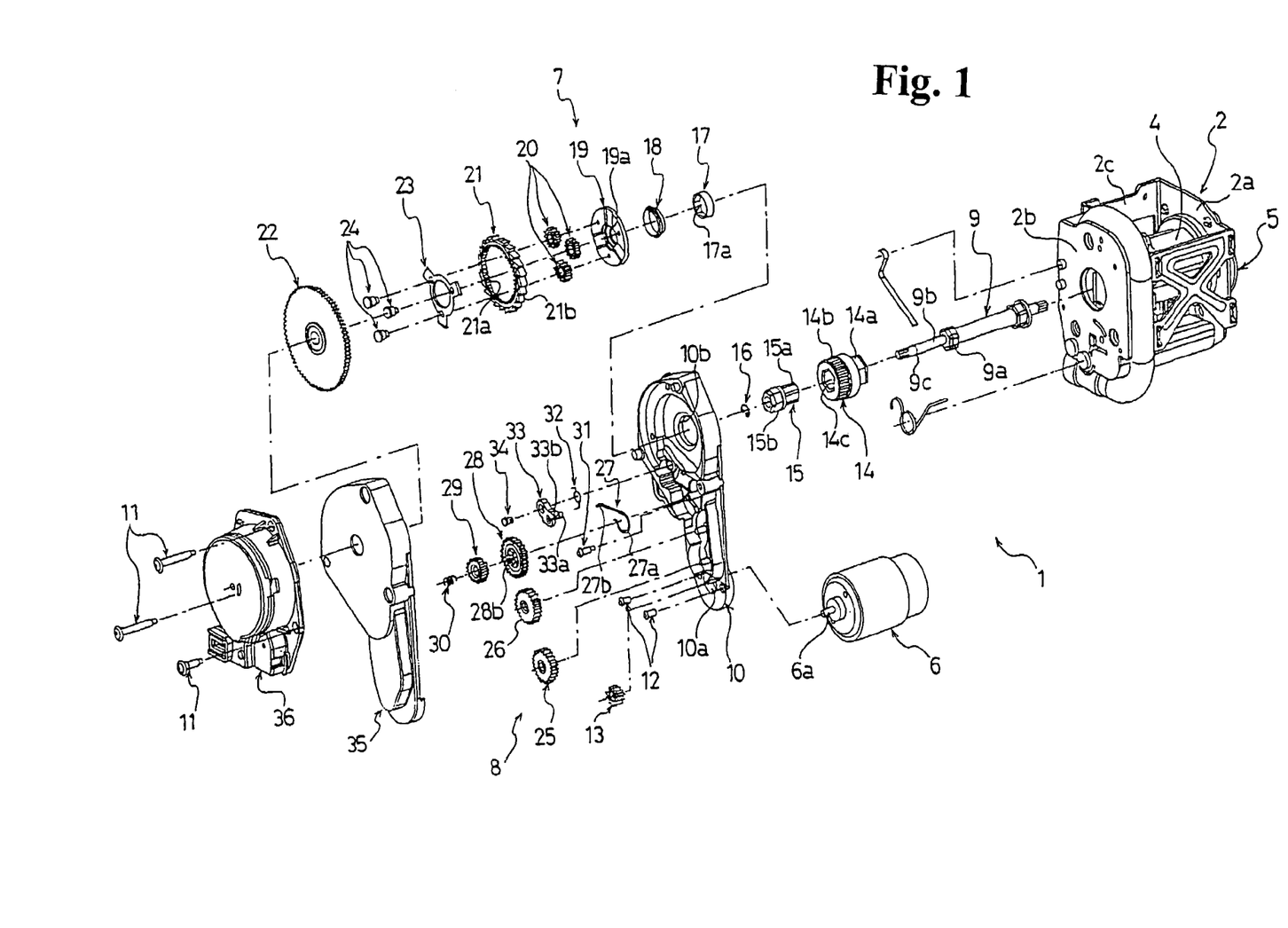
FIG. 1 is a perspective view showing a seat belt retractor according to an embodiment of the present invention.
Figure 2A:
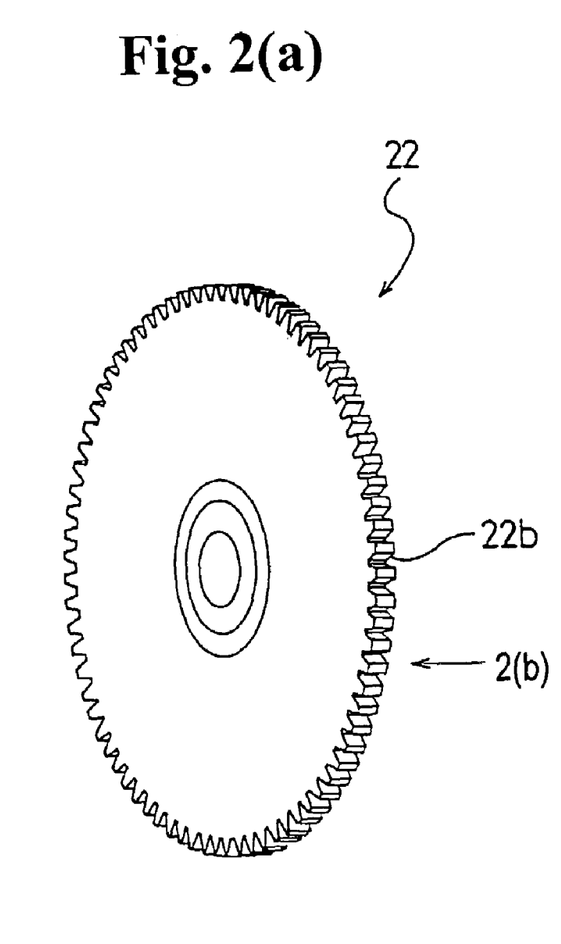
FIG. 2(a) is a perspective view thereof and FIG. 2(b) is a perspective view seen from an arrow direction 2(b) in FIG. 2(a)
Figure 2B:
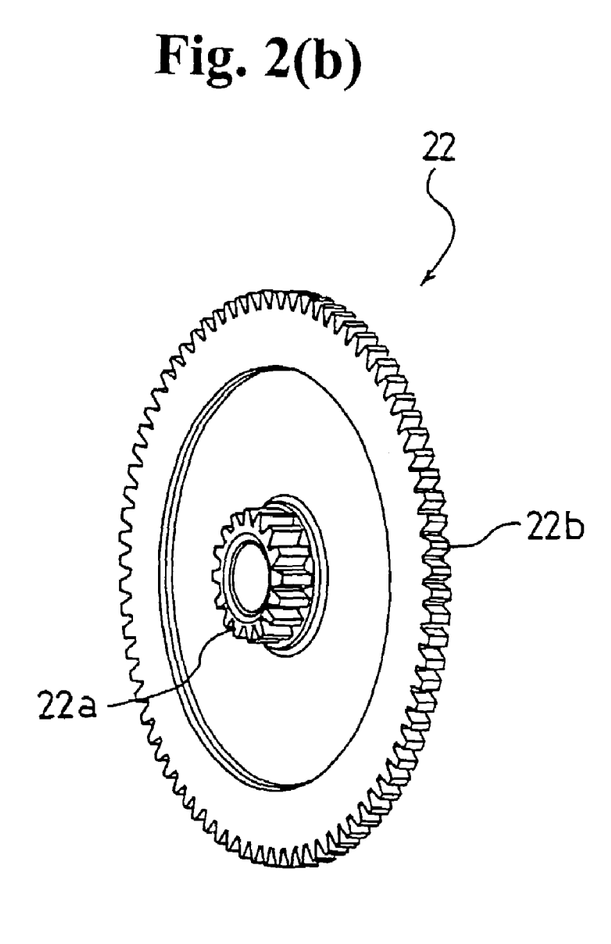
Figure 3A:
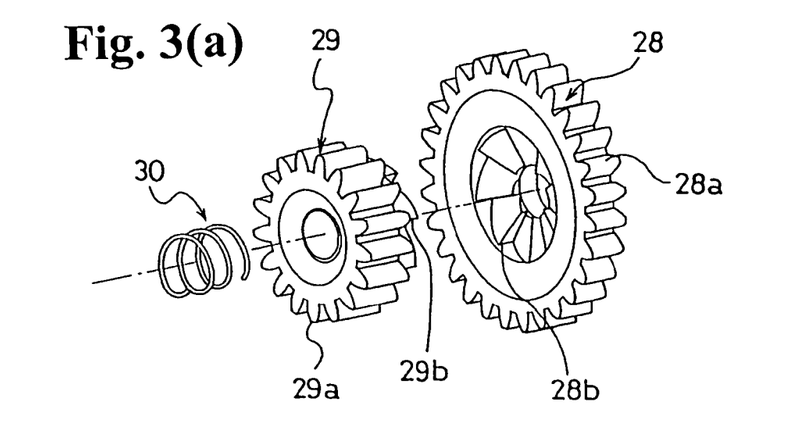
FIG. 3(a) is an exploded perspective view thereof.
Figure 3B:
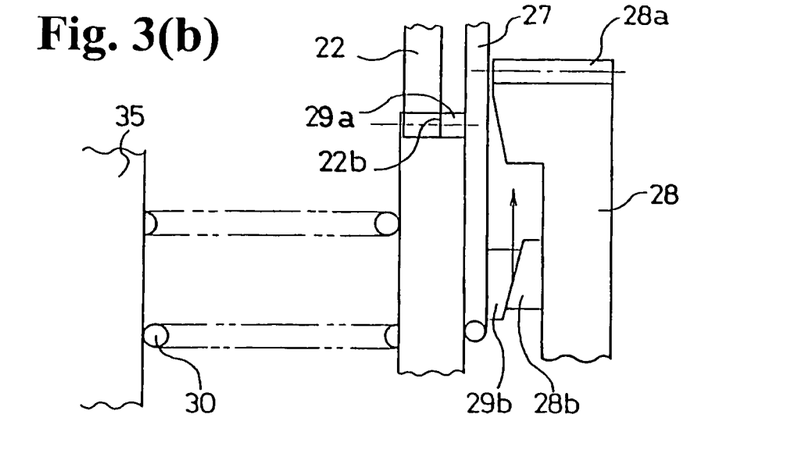
FIG. 3(b) is a schematic view showing a state that the torque limiter mechanism transmits driving torque.
Figure 3C:
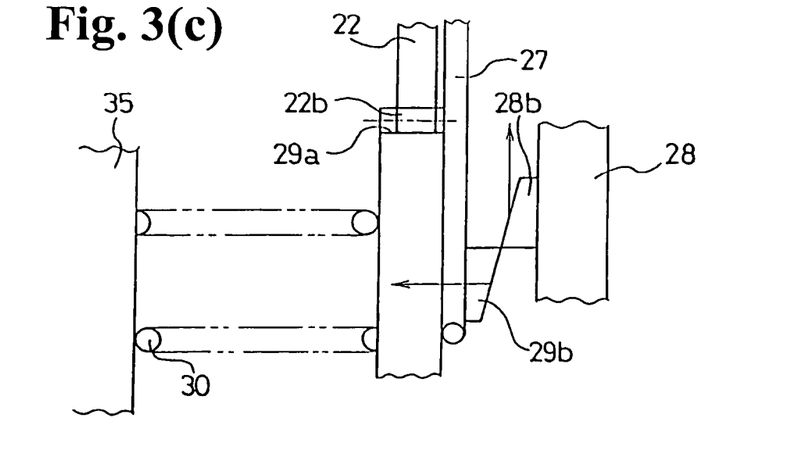
FIG. 3(c) is a schematic view showing a state that the torque limiter mechanism shuts off the driving torque.

FIG. 1 is a perspective view showing a seat belt retractor according to an embodiment of the present invention. FIGS. 2(a) and 2(b) are views showing a sun gear member of a driving torque transmission mechanism in the seat belt retractor shown in FIG. 1, wherein FIG. 2(a) is a perspective view thereof and FIG. 2(b) is a perspective view seen from an arrow direction 2(b) in FIG. 2(a). FIGS. 3(a) to 3(c) are views showing a torque limiter mechanism of the seat belt retractor shown in FIG. 1, wherein FIG. 3(a) is an exploded perspective view thereof, FIG. 3(b) is a schematic view showing a state that the torque limiter mechanism transmits driving torque, and FIG. 3(c) is a schematic view showing a state that the torque limiter mechanism shuts off the driving torque. In the following description, right and left represent right and left in the drawings, and clockwise and counterclockwise represent clockwise and counterclockwise in the drawings unless stated otherwise.

As shown in FIG. 1, a seat belt retractor 1 mainly includes a frame 2; a spool 4 for winding a seat belt; locking means 5 as an ELR mechanism disposed on one side of the frame 2 to be actuated by deceleration larger than a predetermined level upon a collision and the like for locking the spool 4 not to rotate in a direction of unwinding the seat belt; a motor 6 for generating driving torque to rotate the spool 4; a speed reduction mechanism 7 disposed in a driving torque transmission path for reducing a rotational speed of the motor 6 and transmitting the driving torque to the spool 4; and a driving torque transmission gear mechanism (driving torque transmission mechanism) 8 for transmitting the driving torque of the motor 6 to the spool 4 via the speed reduction mechanism 7.

The frame 2 comprises a pair of parallel sidewalls 2a and 2b, and a back plate 2c connected to the sidewalls 2a and 2b. Between the sidewalls 2a and 2b in the frame 2, the spool 4 is rotatably arranged for winding the seat belt. The spool 4 used in the seat belt retractor 1 may be a conventional spool.

The locking means 5 is mounted on the sidewall 2a. The locking means 5 may be locking means used in a conventional seat belt retractor. The locking means 5 is actuated to stop the spool 4 not to rotate in the direction of unwinding the belt when a vehicle sensor (deceleration sensor) detects deceleration larger than a predetermined level acting on a vehicle or when a webbing sensor (belt withdrawing speed sensor) detects a speed higher than a predetermined speed of withdrawing the seat belt.

A torsion bar 9 of a force limiter mechanism (energy absorbing mechanism, hereinafter referred to as an EA mechanism) is arranged between the spool 4 and the locking means 5 for adjusting load on the seat belt when the locking mechanism 5 is activated to stop the seat belt to be withdrawn. The EA mechanism with the torsion bar 9 may be a conventional EA mechanism. When the locking mechanism 5 is activated to stop the seat belt to be withdrawn, the torsion bar 9 is twisted and deformed according to the rotation of the spool 4 in the belt unwinding direction due to inertia of the occupant, thereby limiting the load on the seat belt and absorbing impact energy.

A retainer 10 is mounted on the sidewall 2b of the frame 2 with three screws 11 (described later). The motor 6 is mounted on the retainer 10 at a side thereof attached to the frame 2 with a pair of screws 12. The motor 6 has a rotational shaft 6a passing through a through hole 10a of the retainer 10. The rotational shaft 6a protrudes to a side of the retainer 10 opposite to the frame 2, and a motor gear 13 having external teeth is attached to the rotational shaft 6a at the side, so that the motor gear 13 rotates together with the rotational shaft 6a.

A pinion member 14 is disposed between the spool 4 and a torque transmitting portion 9a of the torsion bar 9 for connecting the spool 4 and the torque transmitting portion 9a in a rotational direction. The pinion member 14 has a rotational connecting portion 14a having a polygonal cylindrical shape (hexagonal cylindrical shape in the embodiment). An outer periphery of the rotational connecting portion 14a is fitted into a hole (not shown) formed at the center of the spool 4 and having the same polygonal section (hexagonal section), so that the pinion member 14 rotates together with the spool 4. The torque transmitting portion 9a of the torsion bar 9 is fitted into an inner periphery of the rotational connecting portion 14a of the pinion member 14, so that the torque transmitting portion 9a rotates together with the pinion member 14.

The pinion member 14 has a pinion 14b formed at an end thereof at a side opposite to the rotational connecting portion 14a. The pinion 14b is arranged coaxially with an axial hole 14c having a polygonal section (hexagonal section in the embodiment). A first rotational connecting portion 15a (formed in a polygonal section same as that of the axial hole 14c) of a connector 15 is fitted into the axial hole 14c, so that the connector 15 rotates together with the pinion member 14. The connector 15 has a second rotational connecting portion 15b formed at an end thereof at a side opposite to the first rotational connecting portion 15a. The second rotational connecting portion 15b has a polygonal section same as that of the first rotational connecting portion 15a and is larger than the first rotational connecting portion 15a.

The connector 15 is fitted to an extension shaft 9b of the torsion bar 9, and a snap ring 16 is fitted in a ring groove 9c of the extending shaft portion 9b, whereby holding the connector 15 not to move in an axial direction (not to come off). The pinion member 14 is held not to come off relative to the connector 15 with a step between the first and second rotational connecting portions 15a and 15b of the connector 15.

A ring-shaped connector-side bush 17 has an inner periphery 17a having a polygonal section same as that of the first rotational connecting portion 15a of the connector 15. The inner periphery 17a of the connector-side bush 17 is fitted to the first rotational connecting portion 15a, so that the connector-side bush 17 is attached to the connector 15 not to rotate relatively. The retainer 10 has a hole 10b for fitting a ring-shaped retainer-side bearing 18 such that the retainer-side bearing 18 does not rotate relative to the retainer 10. The connector-side bush 17 is supported on the retainer-side bearing 18 to rotate relatively, so that the connector 15 is rotatably supported on the retainer 10.

The speed reduction mechanism 7 comprises a carrier 19 formed of a ring-shaped disk, a predetermined number of planet gears 20 (three in the embodiment), an annular ring member 21, and a sun gear member 22. The carrier 19 has an inner periphery 19a having a polygonal section same as that of the second rotational connecting portion 15b of the connector 15. The inner periphery 19a of the carrier is fitted to the second rotational connecting portion 15b so that the carrier 19 is attached to the connector 15 for not allowing relative rotation therebetween (rotating together with the connector 15). In this case, the carrier 19 is positioned between the step formed by the first and second rotational connecting portions 15a and 15b, and the pinion member 14.

The planet gears 20 are rotatably attached to the carrier 19 through a speed reduction plate 23 with a predetermined number of speed reduction pins 24 (three in the embodiment). The ring member 21 has an internal gear 21a formed on the inner periphery thereof and a ratchet gear 21b formed on the outer periphery thereof. The internal gear 21a and the ratchet gear 21b rotate together.

The sun gear member 22 has a sun gear 22a formed of a small-diameter external gear and a large-diameter external gear 22b rotating together as shown in FIGS. 2(a) and 2(b). The planet gears 20 are supported on the carrier 19, and engage the sun gear 22a and the internal gear 21a, thereby forming a planetary gear train. The speed reduction mechanism 7 is the planetary gear train with the sun gear 22a as an input side and the carrier 19 as an output side.

As shown in FIG. 1, the driving torque transmission mechanism 8 comprises a pair of idle gears 25 and 26; a clutch spring 27; a lower connecting gear 28; an upper connecting gear 29; a limiter spring 30; a limiter pin 31; an initial spring 32; a clutch pawl 33; and a clutch pawl pin 34. A pair of the idle gears 25 and 26 is rotatably mounted on the retainer 10 to engage with each other. The idle gear 25 engages the motor gear 13 and the idle gear 26 engages external teeth 28a of the lower-side connecting gear 28.

The lower connecting gear 28 and the upper connecting gear 29 are rotatably mounted on the retainer 10, so that the lower and upper connecting gears 28 and 29 rotate relative to each other. The upper connecting gear 29 is movably arranged to contact or separate from the lower connecting gear 28 in the axial direction. As shown in FIG. 3(a), the lower connecting gear 28 has ratchet teeth 28b formed at the center thereof on the motor side, and the upper connecting gear 29 has ratchet teeth 29b formed at the center thereof on the spool side. The ratchet teeth 29b engage the ratchet teeth 28b of the lower connecting gear 28. The upper connecting gear 29 is urged toward the lower connecting gear 28 with the limiter spring 30.

Accordingly, in the normal state that the load torque in the belt unwinding direction transmitted to the upper connecting gear 29 is lower than a predetermined level because of a set load of the limiter spring 30, the ratchet teeth 28b and 29b engage each other as shown in FIG. 3(b), so that the driving torque of the motor 6 is transmitted from the lower connecting gear 28 to the upper connecting gear 29. A force acts on the ratchet teeth 29b in the axial direction to separate from the ratchet teeth 28b. The load torque is smaller than the predetermined level, so that the limiter spring 30 is not compressed and the engagement between the ratchet teeth 28b and 29b is maintained.

When the load torque exceeds the preset level, the ratchet teeth 28b slip over the ratchet teeth 29b, so that the lower connecting gear 28 rotates relative to the upper connecting gear 29 as shown in FIG. 3(c). Accordingly, the upper connecting gear 29 moves in the axial direction away from the lower connecting gear 28 while compressing the limiter spring 30. As a result, the engagement between the ratchet teeth 28b and 29b is released, so that the load torque exceeding the preset level is not applied to the upper connecting gear 29. Accordingly, the load torque of the motor 6 is limited to be smaller than the preset level, thereby protecting the motor 6 from excessive load torque. In this manner, the clutch composed of the ratchet teeth 28b, the ratchet teeth 29b, and the limiter spring 30 forms the torque limiter mechanism of the embodiment. The upper connecting gear 29 engages the external teeth 22b of the sun gear member 22.

Figure 4A:
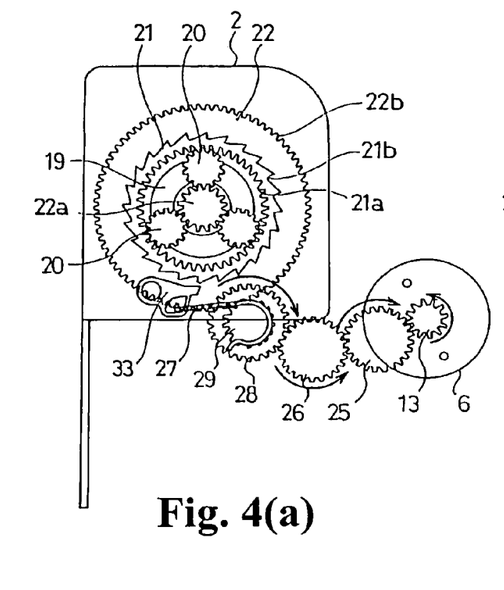
FIG. 4(a) is a view for explaining the process of transmitting the driving torque from a motor to an upper connecting gear.
Figure 4B:
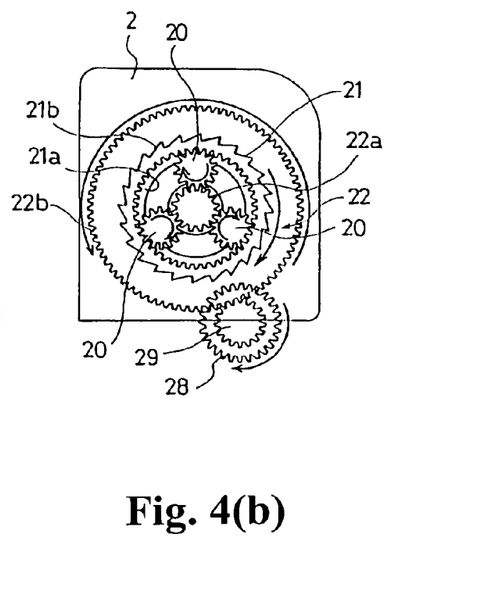
FIG. 4(b) is a view for explaining the process of transmitting the driving torque from the upper connecting gear to a ring member.
Figure 4C:
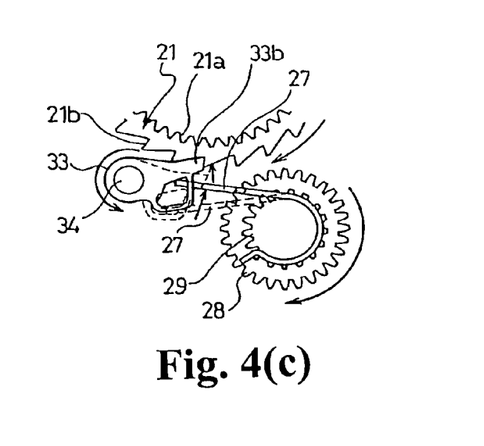
FIG. 4(c) is a view for explaining a state that a pawl member in the seat belt retractor stops rotation of the ring member.

As shown in FIG. 4(c), the clutch spring 27 has a curved portion 27a partially wound around the outer periphery of the external teeth 29b of the upper connecting gear 29. The other end portion 27b of the clutch spring 27 engages an engaging pin 33a of the clutch pawl 33. The clutch pawl 33 is pivotally attached to the retainer 10 with the clutch pawl pin 34 such that an engaging tooth 33b at a tip of the clutch pawl 33 engages one of the ratchet teeth 21b of the ring member 21 rotating in a rotational direction corresponding to the belt winding direction of the spool 4. The clutch pawl 33 is urged in a direction away from the ratchet teeth 21b with the initial spring 32.

In a state that the respective components of the driving torque transmitting gear train 8 are arranged in a concave portion formed in a surface of the retainer 10 opposite to the frame 2, a retainer cover 35 is put on the face and a T/RD cassette 36 is put on the retainer cover 35. The retainer 10, the retainer cover 35, and the T/RD cassette 36 are tightened together and fixed to the sidewall 2b of the frame 2 with three screws 11.

Hereinafter, an action of the seat belt retractor 1 of the embodiment will be described. When the seat belt is not in use, the seat belt is completely wound up on the spool 4 with the driving torque of the motor 6 and is accommodated in the seat belt retractor 1. An action of winding up the seat belt with the motor 6 will be described later. In this state, the motor 6 is stopped and the clutch pawl 33 is spaced away from the ring member 21 with the spring force of the initial spring 32, so that the ring member 21 is freely rotatable. In addition, the upper connecting gear 29 is positioned with the spring force of the limiter spring 30 such that the ratchet teeth 29b engage the ratchet teeth 28b of the lower connecting gear 28.

When an occupant withdraws the seat belt from the seat belt retractor 1 to use the seat belt, the spool 4 rotates in the belt unwinding direction. At this time, since the ring member 21 is freely rotatable, the rotation of the spool 4 is not transmitted to the motor side and the spool 4 easily rotates. Accordingly, the seat belt is smoothly withdrawn. After the seat belt is withdrawn, a tongue is inserted into and latched to a buckle, so that the buckle switch is turn on to drive the motor 6.

When the motor 6 is driven in the rotational direction corresponding to the belt winding direction of the spool 4, the rotational force of the motor 6 is transmitted to the planet gears 20 through the motor gear 13, the pair of idle gears 25, 26, the lower connecting gear 28, the upper connecting gear 29, and the sun gear member 22, so that the planet gears 20 rotate in the clockwise direction.

At this time, since the load torque transmitted to the upper connecting gear 29 in the belt winding direction is smaller than the preset level, the ratchet teeth 28b of the lower connecting gear 28 engage the ratchet teeth 29b of the upper connecting gear 29, so that the clutch composed of the teeth 28b and 29b is turned on. Accordingly, the driving torque of the motor 6 is securely transmitted from the lower connecting gear 28 to the upper connecting gear 29. Since the ring member 21 is freely rotatable, the ring member 21 rotates in the clockwise direction according to the rotation of the planet gears 20 as shown in FIG. 4(b). The planet gears 20 rotate only around axes thereof not along an orbit thereof.

At the same time, the upper connecting gear 29 rotates in the clockwise direction so that the clutch spring 27 also rotates about the upper connecting gear 29 in the clockwise direction. Then, the tip of the clutch spring 27 moves the clutch pawl 33 to rotate about the clutch pawl pin 34 in the counterclockwise direction, so that the engaging tooth 33b moves to a position to engage one of the ratchet teeth 21b. Since the ring member 21 rotates in the clockwise direction, one of the ratchet teeth 21b engages the engaging tooth 33b as shown in FIG. 4(c), so that the clutch composed of the ratchet teeth 21b and the engaging tooth 33b is turned on, thereby stopping the rotation of the ring member 21.

Figure 4D:
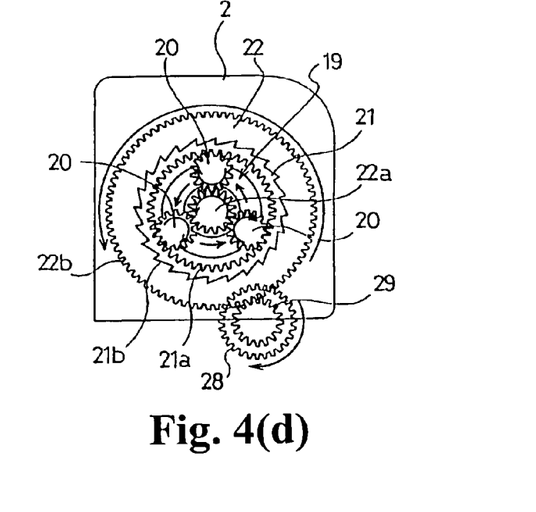
FIG. 4(d) is a view for explaining the process of transmitting the driving torque to a carrier connected to a spool.

When the ring member 21 is stopped, the planet gears 20 rotate along the orbit around the sun gear 22a in the counterclockwise direction while the planet gears 20 rotate around their axes as shown in FIG. 4(d). The orbital rotation of the planet gears 20 rotates the carrier 19 in the counterclockwise direction. In this manner, the rotation of the sun gear member 22 is outputted as the rotation of the carrier 19 after the speed of the rotation is reduced with the planetary gear train. Further, the rotation of the carrier 19 is transmitted to the spool 4 through the connector 15 and the pinion 14, so that the spool 4 rotates in the belt winding direction to wind the seat belt.

Figure 5A:
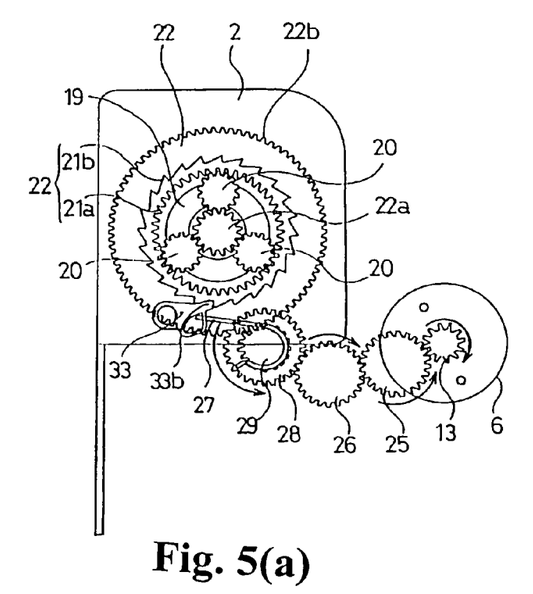
FIG. 5(a) is a view for explaining the process of transmitting the driving torque from the motor to the upper connecting gear.
Figure 5B:
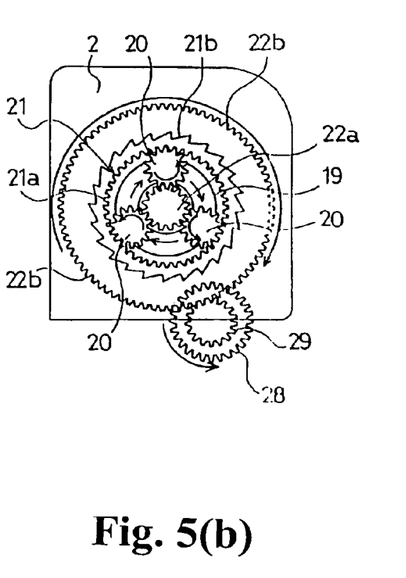
FIG. 5(b) is a view for explaining the process of transmitting the driving torque from the upper connecting gear to the carrier.

As shown in FIG. 5(a), the motor 6 is driven in the clockwise direction (belt unwinding direction of the spool 4). The rotation of the motor 6 is transmitted to the planet gears 20 through the motor gear 13, the pair of idle gears 25 and 26, the lower connecting gear 28, the upper connecting gear 29, and the sun gear member 22, so that the planet gears 20 rotate in the counterclockwise direction around axes thereof as shown in FIG. 5(b). The carrier 19 is urged in the belt unwinding direction due to the belt tension exerted on the seat belt, so that the carrier 19 rotates in the clockwise direction (belt unwinding direction) by the rotation of the planet gears 20 in the counterclockwise direction. The urging force on the carrier 19 in the belt unwinding direction due to the belt tension is reduced according to the rotation of the carrier 19 in the belt unwinding direction, so that the rotation of the carrier 19 is stopped.

Figure 5C:
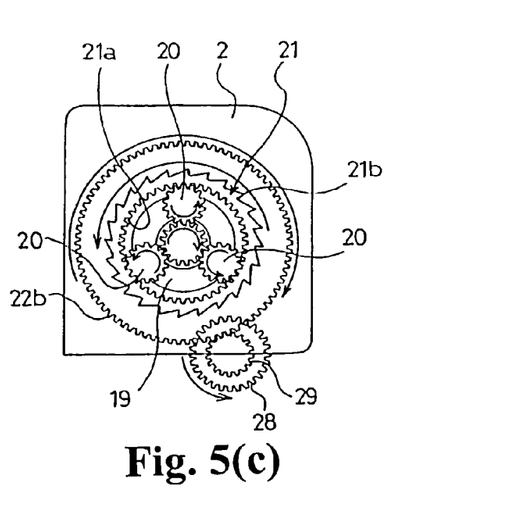
Figure 5D:
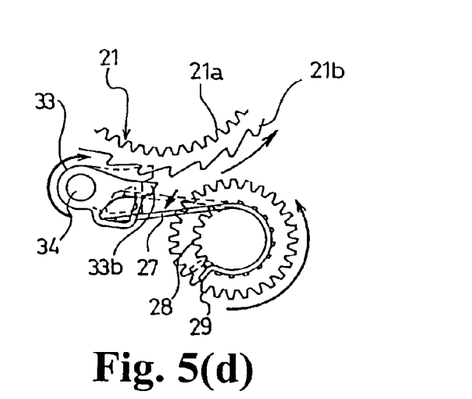
FIG. 5(d) is a view showing a state that the pawl member releases the ring member.

Then, by the rotation of the planet gears 20 in the counterclockwise direction, the ring member 21 is rotated in the counterclockwise direction through the internal gear 21a as shown in FIG. 5(c). The rotation of the ring member 21 reduces the engaging force between the one of the ratchet teeth 21b of the ring member 21 and the engaging tooth 33b of the clutch pawl 33. In this state, by the rotation of the upper connecting gear 29 in the counterclockwise direction, the clutch spring 27 wound around the upper connecting gear 29 rotates about the upper connecting gear 29 in the counterclockwise direction together with the upper connecting gear 29 as shown in FIG. 5(d).

Accordingly, the tip of the clutch spring 27 moves the clutch pawl 33 to rotate about the clutch pawl pin 34 in the clockwise direction to a non-engaging position, i.e. the initial position where the engaging tooth 33b does not engage the ratchet teeth 21b of the ring member 21. Therefore, the engagement between the engaging tooth 33b and the one of the ratchet teeth 21b is released. That is, the clutch composed of the engaging tooth 33b and the ratchet teeth 21b is turned off, so that the ring member 21 is returned to the initial state, i.e. a freely rotatable state.

A large load torque may be exerted on the upper connecting gear 29 due to a cause occurred on the spool side from the upper connecting gear 29 such as belt tension due to deceleration when the vehicle collides lightly in an extent that the locking means 5 as the ELR mechanism is not activated while the motor 6 is driving to wind the seat belt. Accordingly, the load torque on the lower connecting gear 28 to rotate the upper connecting gear 29 by transmitted driving torque of the motor 6 is increased, and the load torque on the motor 6 is also increased. When the load torque on the upper and lower connecting gears 29 and 28 exceeds the preset level, the engagement between the ratchet teeth 28b and 29b is released to turn off the clutch composed thereof as shown in FIG. 3(c), thereby shutting off the driving torque transmission. Accordingly, the load torque exceeding the preset level is not transmitted to the components of the driving torque transmission mechanism and the load torque of the motor 6 does not exceed the preset level, thereby protecting the motor 6 from excessive load torque.

As described above, the seat belt retractor 1 is provided with the torque limiter mechanism. Accordingly, when a large load torque is exerted on the driving torque transmission mechanism due to a cause occurred on the driving torque transmission mechanism such as belt tension due to deceleration when the vehicle collides lightly in an extent that the locking means 5 as the ELR mechanism is not activated while the motor 6 is driving to wind the seat belt, it is possible to prevent a load torque exceeding the preset value from applying the driving torque transmission mechanism. Therefore, it is not necessary to increase strength of the components of the driving torque transmission mechanism such as gears. In addition, it is possible to reduce the load torque on the motor 6, thereby protecting the motor 6 from excessive load torque.

In particular, the torque limiter mechanism is the clutch composed of the motor-side ratchet teeth 28b, the spool-side ratchet teeth 29b, and the limiter spring 30, thereby making the torque limiter mechanism simple.

The seat belt retractor of the present invention is applicable to a seat belt device installed in a seat of a vehicle such as an automobile for restraining and protecting an occupant.

Figure 6:
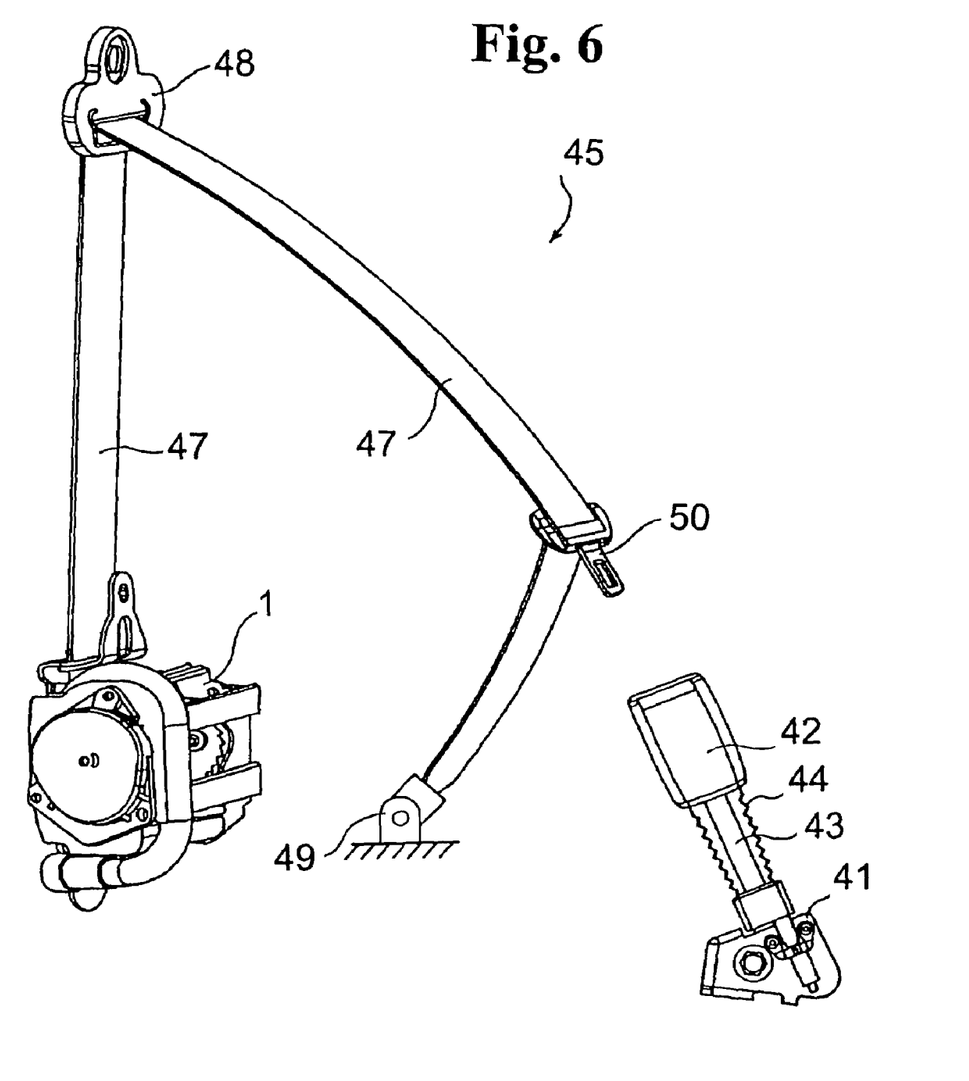
FIG. 6 is a view showing a seat belt device provided with the seat belt retractor shown in FIG. 1.

FIG. 6 is a view showing a seat belt device provided with the seat belt retractor 1 shown in FIG. 1. As shown in FIG. 6, a seat belt device 45 includes the seat belt retractor 1 fixed to a portion of a vehicle body such as a vehicle floor and the like; a belt guide 48 attached to a portion of the vehicle body such as a center pillar and the like for guiding a seat belt 47 extending from the seat belt retractor 1 into a predetermined position relative to an occupant; an anchor 49 fixed to a portion of the vehicle body such as a floor and the like on an outer side of a vehicle seat and to which an end of the seat belt 47 is connected; a tongue 50 slidably supported to the seat belt 47; a buckle 42 fixed to a portion of the vehicle body such as a floor and the like on an inner side of the vehicle seat and to which the tongue 50 can be latched; a buckle supporting member 41 for supporting the buckle 42; a connecting member 43 connecting the buckle supporting member 41 and the buckle 42; and a boot 44 disposed between the buckle 42 and the buckle supporting member 41.

While the invention has been explained with reference to the specific embodiments of the invention, the explanation is illustrative and the invention is limited only by the appended claims.

What is claimed is:

1. A seat belt retractor for winding a seat belt, comprising:
a spool for winding the seat belt,
a motor connected to the spool for generating driving torque to rotate the spool,
a driving torque transmission mechanism disposed between the motor and the spool and formed of at least one gear for transmitting the driving torque of the motor to the spool, and
a torque limiter mechanism disposed in the driving torque transmission mechanism for preventing an excessive load greater than a predetermined level from being transmitted from the spool to the motor,
wherein said torque limiter mechanism is formed of a clutch comprising first ratchet teeth with inclined surfaces disposed at a motor side connected to the motor for receiving the driving torque from the motor, second ratchet teeth with inclined surfaces disposed at a spool side connected to the spool for transmitting the driving torque to the spool, and a spring for urging the first and second ratchet teeth to engage together, said inclined surfaces of the first and second ratchet teeth engaging together by the spring to transmit the driving torque from the motor to the spool in a normal state and slipping by compressing the spring to disengage the second ratchet teeth from the first ratchet teeth for preventing the excessive load from being applied from the spool to the motor when the excessive load for rotating the spool in a seat belt withdrawing direction is generated.

2. A seat belt device comprising the seat belt retractor according to claim 1, the seat belt, a tongue for passing the seat belt, and a buckle for engaging the tongue.

3. A seat belt retractor according to claim 1, wherein said second ratchet teeth is urged by the spring toward the first ratchet teeth.

4. A seat belt retractor according to claim 3, wherein said inclined surfaces of the first ratchet teeth are arranged to push the inclined surfaces of the second ratchet teeth in the axial direction when the motor is rotated.

5. A seat belt retractor according to claim 4, wherein said driving torque transmission mechanism includes a lower connecting gear and an upper connecting gear arranged axially, said first and second ratchet teeth being formed on side surfaces of the upper and lower connecting gears, respectively.

6. A seat belt retractor according to claim 5, wherein said torque limiter mechanism further prevents the load greater than the predetermined level from being transmitted from the motor to the driving torque transmission mechanism.

7. A seat belt retractor according to claim 6, wherein said driving torque transmission mechanism includes a speed reduction mechanism connected to the spool, said torque limiter being located between the speed reduction mechanism and the motor.

8. A seat belt retractor for winding a seat belt, comprising:
a spool for winding the seat belt,
a motor connected to the spool for generating driving torque to rotate the spool,
a driving torque transmission mechanism disposed between the motor and the spool and formed of an upper connecting gear, a clutch pawl, and other gears for transmitting the driving torque of the motor to the spool,
a torque limiter mechanism disposed in the driving torque transmission mechanism for preventing a load greater than a predetermined level from being transmitted from the motor to the driving torque transmission mechanism and from the spool to the motor, and
a clutch spring having a curved portion partially wound around an outer periphery of the upper connecting gear, and an end portion engaging the clutch pawl for urging the clutch pawl according to rotation of the upper connecting gear,
wherein said torque limiter mechanism is formed of a clutch comprising first ratchet teeth with inclined surfaces disposed at a motor side connected to the motor for receiving the driving torque from the motor, second ratchet teeth with inclined surfaces formed on the upper connecting gear at a spool side for transmitting the driving torque to the spool, and a spring for urging the first and second ratchet teeth to engage together, said inclined surfaces of the first and second ratchet teeth engaging together by the spring to transmit the driving torque from the motor to the spool in a normal state and slipping by compressing the spring to disengage the second ratchet teeth from the first ratchet teeth when the driving torque exceeds the predetermined level, said inclined surfaces also slipping for preventing the load from being applied from the spool to the motor when the load for rotating the spool in a seat belt withdrawing direction is generated.

9. A seat belt retractor according to claim 8, wherein said driving torque transmission mechanism further includes a lower connecting gear, said inclined surfaces of the first ratchet teeth being formed at a side surface of the lower connecting gear to face the second ratchet teeth.

10. A seat belt device comprising the seat belt retractor according to claim 8, the seat belt, a tongue for passing the seat belt, and a buckle for engaging the tongue.

* * * * *